United States Patent
Yamamoto et al.

(10) Patent No.: US 11,777,084 B2
(45) Date of Patent: Oct. 3, 2023

(54) NON-AQUEOUS ELECTROLYTE SECONDARY BATTERY INCLUDING A POSITIVE ELECTRODE ACTIVE SUBSTANCE CONTAINING A LITHIUM COMPOSITE OXIDE POROUS PARTICLE HAVING VOIDS

(71) Applicants: TOYOTA JIDOSHA KABUSHIKI KAISHA, Toyota (JP); Sumitomo Metal Mining Co., Ltd., Tokyo (JP)

(72) Inventors: Yuji Yamamoto, Toyota (JP); Momoko Procter, Seto (JP); Yoshinari Makimura, Nisshin (JP); Tetsutaro Hayashi, Niihama (JP); Willy Shun Kai Bong, Niihama (JP)

(73) Assignees: TOYOTA JIDOSHA KABUSHIKI KAISHA, Toyota (JP); SUMITOMO METAL MINING CO., LTD., Tokyo (JP)

( * ) Notice: Subject to any disclaimer, the term of this patent is extended or adjusted under 35 U.S.C. 154(b) by 356 days.

(21) Appl. No.: 16/925,714

(22) Filed: Jul. 10, 2020

(65) Prior Publication Data
US 2021/0020922 A1     Jan. 21, 2021

(30) Foreign Application Priority Data

Jul. 18, 2019 (JP) .................................. 2019-133132

(51) Int. Cl.
*H01M 4/62* (2006.01)
*H01M 4/485* (2010.01)
(Continued)

(52) U.S. Cl.
CPC ........... *H01M 4/366* (2013.01); *H01M 4/485* (2013.01); *H01M 4/62* (2013.01);
(Continued)

(58) Field of Classification Search
CPC ............. H01M 4/36–628; H01M 4/02; H01M 10/0525
See application file for complete search history.

(56) References Cited

U.S. PATENT DOCUMENTS

| | | |
|---|---|---|
| 2016/0013479 A1 | 1/2016 | Iwasaki |
| 2019/0020023 A1 | 1/2019 | Yokoyama et al. |

(Continued)

FOREIGN PATENT DOCUMENTS

| | | |
|---|---|---|
| EP | 3331069 A1 | 6/2018 |
| JP | 2001-085006 A | 3/2001 |

(Continued)

OTHER PUBLICATIONS

Aug. 30, 2022 Office Action issued in U.S. Appl. No. 16/925,750.
Dec. 21, 2022 Office Action issued in U.S. Appl. No. 16/925,750.
Jun. 1, 2023 Office Action issued in U.S. Appl. No. 16/925,750.

*Primary Examiner* — Allison Bourke
*Assistant Examiner* — Bethany C Bouchard
(74) *Attorney, Agent, or Firm* — Oliff PLC

(57) ABSTRACT

A non-aqueous electrolyte secondary battery which is obtained using a lithium composite oxide having a layered structure and coated with a tungsten-containing compound in a positive electrode active substance, and which has a low initial resistance, and in which an increase in resistance following repeated charging and discharging is suppressed. The non-aqueous electrolyte secondary battery includes a positive electrode, a negative electrode and a non-aqueous electrolyte. The positive electrode includes a positive electrode active substance layer containing a lithium composite oxide having a layered structure. The lithium composite oxide includes a porous particle having a void ratio of not less than 20% but not more than 50%. The porous particle contains two or more voids having diameters that are at least 10% of the particle diameter of the porous particle. The (Continued)

surface of the porous particle is provided with a coating containing tungsten oxide and lithium tungstate.

5 Claims, 3 Drawing Sheets

(51) Int. Cl.
   *H01M 4/36* (2006.01)
   *H01M 4/02* (2006.01)
   *H01M 10/0525* (2010.01)

(52) U.S. Cl.
   CPC .. *H01M 10/0525* (2013.01); *H01M 2004/021* (2013.01); *H01M 2004/028* (2013.01)

(56) References Cited

U.S. PATENT DOCUMENTS

| | | |
|---|---|---|
| 2019/0036112 A1 | 1/2019 | Aida et al. |
| 2021/0020900 A1 | 1/2021 | Yamamoto et al. |
| 2021/0020923 A1 | 1/2021 | Yamamoto et al. |

FOREIGN PATENT DOCUMENTS

| | | |
|---|---|---|
| JP | 2017-084628 A | 5/2017 |
| KR | 20160007352 A | 1/2016 |
| WO | 2015/108163 A1 | 7/2015 |
| WO | 2017/073238 A1 | 5/2017 |

NON-AQUEOUS ELECTROLYTE SECONDARY BATTERY INCLUDING A POSITIVE ELECTRODE ACTIVE SUBSTANCE CONTAINING A LITHIUM COMPOSITE OXIDE POROUS PARTICLE HAVING VOIDS

BACKGROUND OF THE INVENTION

1. Field of the Invention

The present disclosure relates to a non-aqueous electrolyte secondary battery. This application claims the benefit of foreign priority to Japanese Patent Application No. 2019-133132, filed on Jul. 18, 2019, which is herein incorporated by reference in its entirety.

2. Description of the Related Art

In recent years, non-aqueous electrolyte secondary batteries such as lithium ion secondary batteries have been advantageously used as portable power sources for personal computers, handheld devices, and the like, and as motive power sources for vehicles such as electric vehicles (EV), hybrid vehicles (HV) and plug-in hybrid vehicles (PHV).

Positive electrode active substances able to store and release ions that serve as charge carriers are generally used in non-aqueous electrolyte secondary batteries. A lithium composite oxide having a layered structure can be given as an example of a positive electrode active substance (for example, see WO 2017/073238). WO 2017/073238 indicates that it is possible to improve characteristics of a non-aqueous electrolyte secondary battery by coating the surface of a lithium composite oxide having a layered structure with a tungsten-containing compound.

SUMMARY OF THE INVENTION

However, as a result of diligent research, the inventors of the present disclosure found that a conventional non-aqueous electrolyte secondary battery had problems of exhibiting high initial resistance and undergoing an increase in resistance following repeated charging and discharging.

Therefore, the purpose of the present disclosure is to provide a non-aqueous electrolyte secondary battery which is obtained using a lithium composite oxide having a layered structure and coated with a tungsten-containing compound in a positive electrode active substance, and which has a low initial resistance, and in which an increase in resistance following repeated charging and discharging is suppressed.

The non-aqueous electrolyte secondary battery disclosed here includes a positive electrode, a negative electrode and a non-aqueous electrolyte. The positive electrode is provided with a positive electrode active substance layer. The positive electrode active substance layer contains a lithium composite oxide having a layered structure. The lithium composite oxide is a porous particle. The void ratio of the porous particle is not less than 20% but not more than 50%. The porous particle contains two or more voids having diameters that are at least 10% of the particle diameter of the porous particle. The surface of the porous particle is provided with a coating that contains tungsten oxide and lithium tungstate.

Provided by such features is a non-aqueous electrolyte secondary battery which is obtained using a lithium composite oxide having a layered structure and coated with a tungsten-containing compound in a positive electrode active substance, and which has a low initial resistance, and in which an increase in resistance following repeated charging and discharging is suppressed.

In a desired aspect of the non-aqueous electrolyte secondary battery disclosed here, the ratio of the amount of tungsten contained in the coating present on the entire surface of the lithium composite oxide relative to the amount of tungsten contained in the coating present on the outer surface of the lithium composite oxide is not less than 1.3 but not more than 1.8.

Provided by such a configuration is a non-aqueous electrolyte secondary battery having a lower initial resistance.

In a desired aspect of the non-aqueous electrolyte secondary battery disclosed here, the coverage ratio of the surface of the porous particle by the coating is not less than 10% but not more than 20%.

Provided by such a configuration is a non-aqueous electrolyte secondary battery having a lower initial resistance.

DESCRIPTION OF THE PREFERRED EMBODIMENTS

Figure 1:
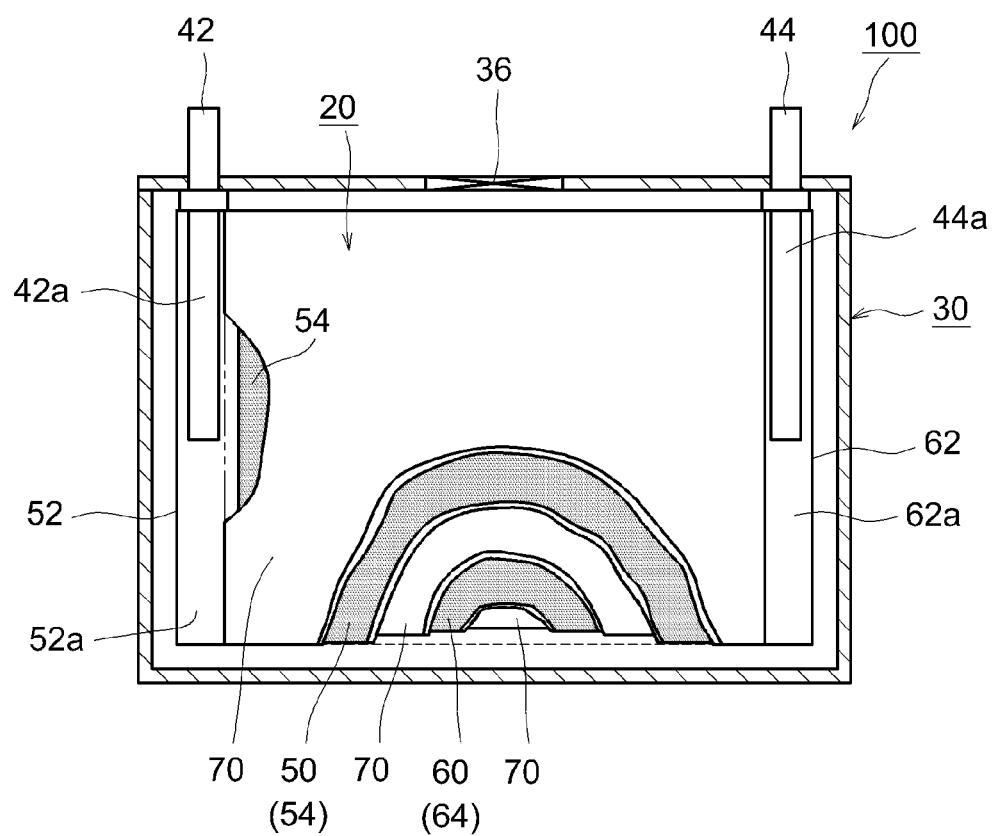
FIG. 1 is a cross-sectional view that schematically illustrates the internal structure of a lithium ion secondary battery according to one embodiment of the present disclosure.

Embodiments according to the present disclosure will now be explained with reference to the drawings. It should be noted that matters which are essential for carrying out the disclosure and which are matters other than those explicitly mentioned in this specification (for example, ordinary features and production processes of the non-aqueous electrolyte secondary battery that do not characterize the present disclosure) are matters that a person skilled in the art could understand to be matters of design on the basis of the prior art in this technical field. The present disclosure can be carried out on the basis of the matters disclosed in the present specification and common general technical knowledge in this technical field. In addition, members/parts that perform the same action are denoted by the same symbols in the drawings below. In addition, the dimensional relationships (length, width, thickness and so on) in the drawings do not reflect actual dimensional relationships.

It should be noted that the term "secondary battery" in the present specification means electricity storage devices in general that can be repeatedly charged and discharged, and is a term that encompasses so-called storage batteries and electricity storage elements such as electrical double layer capacitors.

The present disclosure will now be explained in detail using a flat square lithium ion secondary battery which has a flat wound electrode body and a flat battery case as an example, but the present disclosure is in no way limited to the battery described in this embodiment.

A lithium ion secondary battery 100 shown in FIG. 1 is a sealed lithium ion secondary battery 100 constructed by housing a flat wound electrode body 20 and a non-aqueous electrolyte (not shown) in a flat square battery case (that is to say, an outer container) 30. The battery case 30 is provided with a positive electrode terminal 42 and negative electrode terminal 44 for external connections, and a thin safety valve 36, which is set to release the pressure inside the battery case 30 when this pressure exceeds a predetermined level. In addition, the battery case 30 is provided with an injection port (not shown) for injecting the non-aqueous electrolyte. The positive electrode terminal 42 is electrically connected to a positive electrode current collector plate 42a. The negative electrode terminal 44 is electrically connected to a negative electrode current collector plate 44a. A metallic material which is lightweight and exhibits good thermal conductivity, such as aluminum, can be used as the constituent material of the battery case 30.

Figure 2:
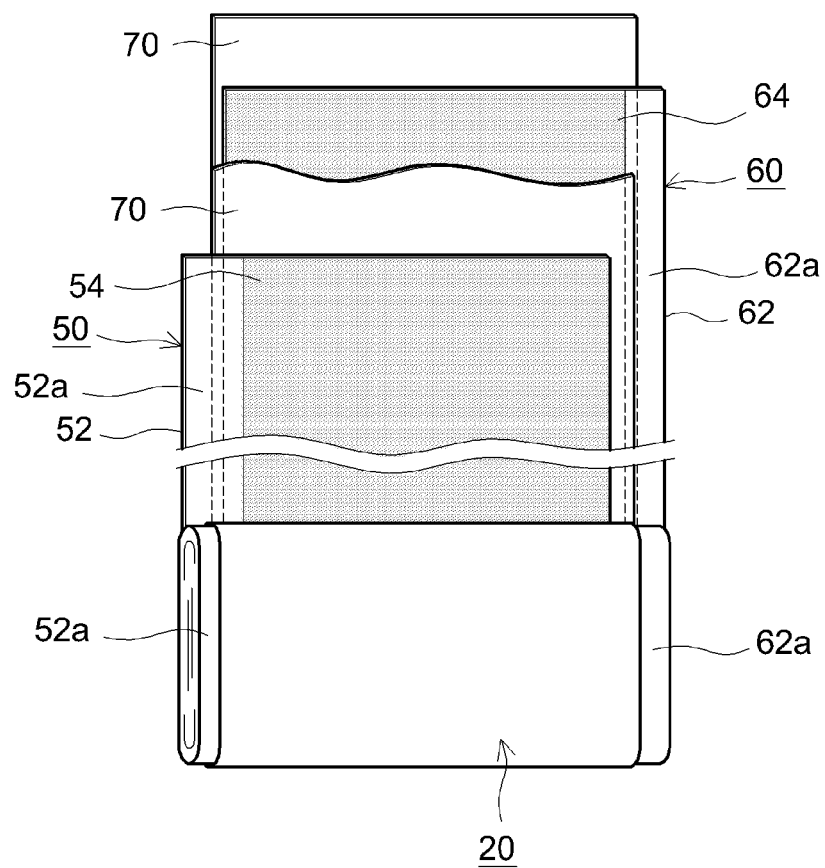
FIG. 2 is a schematic diagram that illustrates a configuration of a wound electrode body of a lithium ion secondary battery according to one embodiment of the present disclosure.

As shown in FIG. 1 and FIG. 2, the wound electrode body 20 is formed into a flat shape by overlaying a positive electrode sheet 50 in which a positive electrode active substance layer 54 is formed in the longitudinal direction on one surface or both surfaces (both surfaces in this case) of a long strip-shaped positive electrode current collector 52, and a negative electrode sheet 60 in which a negative electrode active substance layer 64 is formed in the longitudinal direction on one surface or both surfaces (both surfaces in this case) of a long strip-shaped negative electrode current collector 62, with two long separator sheets 70 interposed therebetween, and then winding this overlaid article in the longitudinal direction. Moreover, a positive electrode active substance layer-non-formed part 52a (that is, a part on which the positive electrode active substance layer 54 is not formed and the positive electrode current collector 52 is exposed) and a negative electrode active substance layer-non-formed part 62a (that is, a part on which the negative electrode active substance layer 64 is not formed and the negative electrode current collector 62 is exposed), which are formed so as to protrude from both edges of the wound electrode body 20 in the winding axis direction (that is, the sheet width direction that is perpendicular to the longitudinal direction), are joined to the positive electrode current collector plate 42a and the negative electrode current collector plate 44a, respectively.

An aluminum foil can be given as an example of the positive electrode current collector 52 that constitutes the positive electrode sheet 50.

The positive electrode active substance layer 54 contains, as a positive electrode active substance, a lithium composite oxide having a layered structure.

Examples of lithium composite oxides having a layered structure include lithium nickel-based composite oxides, lithium manganese-based composite oxides, lithium cobalt-based composite oxides, lithium nickel cobalt aluminum-based composite oxides, lithium iron nickel manganese-based composite oxides and lithium nickel cobalt manganese-based composite oxides. Of these, lithium nickel cobalt manganese-based composite oxides are desired from the perspective of exhibiting more excellent resistance characteristics.

It should be noted that in the present specification, "lithium nickel cobalt manganese-based composite oxide" is a term that encompasses not only oxides containing Li, Ni, Co, Mn and O as constituent elements, but also oxides containing one or two or more additional elements in addition to these elements. Examples of such additional elements include transition metal elements and typical metal elements such as Mg, Ca, Al, Ti, V, Cr, Si, Y, Zr, Nb, Mo, Hf, Ta, W, Na, Fe, Zn and Sn. Furthermore, additional elements may be metalloid elements such as B, C, Si and P, and non-metallic elements such as S, F, Cl, Br and I. The content of these additional elements is desirably 0.1 moles or less relative to the amount of lithium. The same also applies to the lithium nickel-based composite oxides, lithium cobalt-based composite oxides, lithium manganese-based composite oxides, lithium nickel cobalt aluminum-based composite oxides and lithium iron nickel manganese-based composite oxides mentioned above.

In the present embodiment, the lithium composite oxide having a layered structure is a porous particle. The porous particle has at least two voids.

Voids may, or may not, be open. If a void is open, a single void may have two or more openings.

With regard to voids in the porous particle, the void ratio of the porous particle in the present embodiment is not less than 20% but not more than 50%. The technical significance of this numerical range is explained later.

The void ratio of the porous particle can be determined by using, for example, the method described below. First, the cross-sectional electron microscope image mentioned above is obtained using a scanning electron microscope (SEM), a transmission electron microscope (TEM), or the like, and the ratio of the total area of void parts relative to the area of the overall particle (the sum of the area occupied by the particle and the area of void parts) is calculated as a percentage. In addition, this percentage is calculated for 100 or more arbitrarily selected particles, the average value thereof is determined, and this average value is taken to be the void ratio of the porous particle. It should be noted that in cases where a void has an opening, the outline of the void is not closed. In this case, a straight line is drawn between both edges of the opening, and the area of the region enclosed by the outline of the void and this straight line is calculated.

In the present embodiment, the proportion of particles having a void ratio of not less than 10% but more than 50% is desirably 80% or more. Confirmation of whether or not the proportion of particles having a void ratio of not less than 10% but more than 50% is 80% or more is conducted using 100 or more arbitrarily selected particles.

With regard to voids in the porous particle, the porous particle in the present embodiment includes two or more voids having diameters that are at least 10% of the particle diameter of the porous particle. The technical significance of this feature is explained later.

With regard to voids having diameters that are at least 10% of the particle diameter, the upper limit for the void diameter is determined by a relationship with the upper limit of the void ratio, but the void diameter is desirably not more than 24% of the particle diameter.

The diameter of the porous particle can be determined in the following way, for example. A SEM image of a cross section of the porous particle is obtained. In this cross section SEM image, the maximum diameter of the porous particle is first determined, and this is taken to be the length L. The maximum diameter among diameters that are perpendicular to the length L is determined, and this is taken to be the width W. The average value of the length L and the width W (that is, (length L+width W)/2) is determined as the particle diameter. It should be noted that, this processing may be carried out using image analysis software (for example, "WinROOF 6.1.1" available from Mitani Corporation).

The diameter of the void can be determined in the following way, for example. In the cross section SEM image, the void is subjected to inscribed elliptic approximation, and the average value of the length LH and width WH of the inscribed ellipse (that is, (length LH+width WH)/2) is determined as the diameter of the void. It should be noted that the inscribed elliptic approximation can be carried out using image analysis software (for example, "WinROOF 6.1.1" available from Mitani Corporation), and in this case, optimal inscribed elliptic approximation is carried out, as appropriate, depending on the image analysis software processing capacity.

The porous particle used in the present embodiment is typically a secondary particle composed of aggregated primary particles. Here, in ordinary porous particles that are secondary particles formed simply by aggregation of primary particles, the number of voids having diameters that are at least 10% of the particle diameter is 0. In addition, in ordinary porous particles that are secondary particles formed by aggregation of primary particles in the form of a shell, the number of voids having diameters that are at least 10% of the particle diameter is 1. Therefore, in the present embodiment, secondary particles in which primary particles are loosely aggregated and which thus have larger voids than normal are typically used.

A porous particle having such voids can be produced in accordance with publicly known methods. In particular, in a method including producing a metal hydroxide that serves as a precursor of a lithium composite oxide by means of a crystallization method and then firing this metal hydroxide together with a lithium compound, it is possible to control the porous structure of the porous particle by adjusting conditions in the crystallization method.

The average particle diameter (median diameter: D50) of the lithium composite oxide is not particularly limited, but is, for example, not less than 0.1 μm but not more than 20 μm, desirably not less than 0.5 μm but not more than 15 μm, and more desirably not less than 3 μm but not more than 15 μm. It should be noted that the average particle diameter of the positive electrode active substance can be determined by, for example, obtaining a SEM image of a cross section of the positive electrode active substance and determining the particle diameters of 20 or more arbitrarily selected particles in the manner described above, and then calculating the average value of these particle diameters.

In the present embodiment, the surface of the porous particle is provided with a coating that contains tungsten oxide and lithium tungstate.

The form of the coating is not particularly limited. It is desirable for the coating to partially cover the porous particle. It is more desirable for the coating to be particulate, and for this particulate coating to be scattered on the surface of the porous particle.

The coating desirably consists substantially or essentially of tungsten oxide and lithium tungstate. That is, the coating generally contains only tungsten oxide and lithium tungstate, but may contain other components at quantities whereby the advantageous effects of the present disclosure are not impaired (for example, 5 mass % or less, more desirably 1 mass % or less, and further desirably less than 0.1 mass % of the coating). The coating more desirably consists of only tungsten oxide and lithium tungstate.

In the present embodiment, at least a part of the coating present on the surface of the porous particle may contain both tungsten oxide and lithium tungstate. Therefore, in addition to a mode in which the entire coating present on the surface of the porous particle contains both tungsten oxide and lithium tungstate, modes in which at least a part of the coating present on the surface of the porous particle contains both tungsten oxide and lithium tungstate and another coating contain only tungsten oxide and/or another coating contain only lithium tungstate are also possible.

The tungsten oxide contained in the coating typically has the composition $WO_3$.

The lithium tungstate contained in the coating is a composite oxide containing lithium (Li) and tungsten (W). In the lithium tungstate, the ratio of the number of atoms of lithium (Li) to the number of atoms of tungsten (W) is not particularly limited. The lithium tungstate can have a composition such as $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10}O_{30}$ or $Li_{18}W_5O_{15}$. The lithium tungstate may be hydrated.

The lithium tungstate desirably has a composition represented by the formula $Li_pWO_q$ ($0.3 \leq p \leq 6.0$, and $3.0 \leq q \leq 6.0$), and more desirably has a composition represented by the formula $Li_2WO_4$.

Is desirable for the coating to be present not only on the outer surface of the porous particle, but also on an inner surface of the porous particle (i.e., a surface inside the porous particle where a void is present).

From the perspective of the initial resistance of the lithium ion secondary battery 100 being particularly lowered, it is desirable for the ratio of the amount of tungsten contained in the coating present on the entire surface of the lithium composite oxide relative to the amount of tungsten contained in the coating present on the outer surface of the lithium composite oxide to be not less than 1.3 but not more than 1.8, and more desirably not less than 1.3 but not more than 1.6.

This ratio can be determined by means of analysis using, for example, a scanning electron microscope (SEM)-energy dispersive X-ray analysis (EDX) device. Specifically, this ratio can be determined in the following way, for example. First, a SEM image of a cross section is obtained and EDX mapping is carried out. Parts where tungsten element is present are colored, and the total area of colored parts (that is, parts where tungsten is present) on the overall surface of one particle and the total area of colored parts on the outer surface of this particle are determined. The ratio of the total area of colored parts on the overall surface relative to the total area of colored parts on the outer surface (total area of colored parts on the overall surface/total area of colored parts on outer surface) is calculated. Next, this ratio is determined for 20 arbitrarily selected particles, the average value thereof is calculated, and this average value is taken to be the ratio mentioned above.

The amount of the coating that covers the lithium composite oxide is not particularly limited.

From the perspective of the initial resistance of the lithium ion secondary battery 100 being particularly lowered, the coverage ratio of the surface of the porous particle by the coating is desirably not less than 10% but not more than 20%, and more desirably not less than 15% but not more than 20%.

The coverage ratio of the porous particle by the coating can be determined by quantitatively determining the proportions of elements on the surface of the porous particle by means of, for example, X-ray photoelectron spectroscopy (XPS). Specifically, the proportion of tungsten (W) element and the proportions of metal elements (Me) other than Li among metal elements that constitute the lithium composite oxide on the surface of the porous particle are calculated using the units "Atomic %". The coverage ratio can be calculated on the basis of the following formula using the proportion of W element expressed in terms of "Atomic %" and the proportion of Me elements expressed in terms of "Atomic %".

Coverage ratio (%)={W/(W+Me)}×100

It should be noted that the coating of tungsten oxide and lithium tungstate can be formed in accordance with publicly known methods. For example, the coating can be formed by mixing porous particles and tungsten oxide and lithium tungstate in the presence of water or an alcohol solvent having a 1 to 4 carbon atoms, such as ethanol, and then removing the water or the alcohol solvent by drying.

Figure 3:
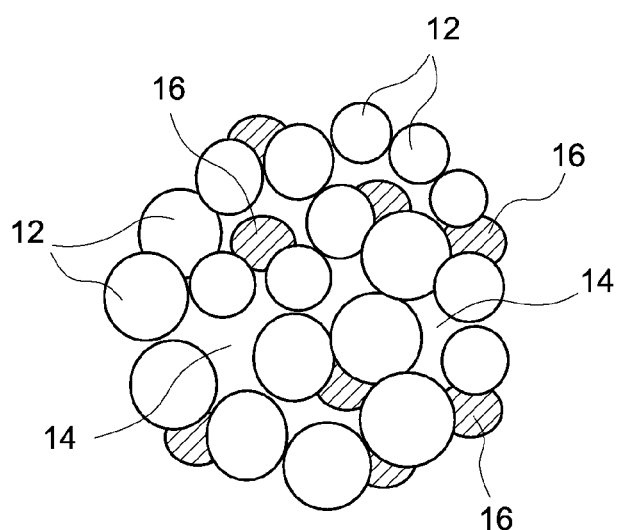
FIG. 3 is a cross-sectional view that schematically illustrates an example of a porous particle used in a lithium ion secondary battery according to one embodiment of the present disclosure.

A specific example of the structure of the porous particle is shown in FIG. 3. FIG. 3 is a schematic cross-sectional view of an example of a porous particle. As shown in FIG. 3, a porous particle 10 is a secondary particle composed of aggregated primary particles 12. In the secondary particle, the primary particles are more loosely aggregated than normal, and therefore the secondary particle has relatively large voids 14. The diameters of at least two of the voids 14 have lengths that are at least 10% of the secondary particle diameter.

In addition, the coating 16, which contains tungsten oxide and lithium tungstate, is present on the outer surface and an inner surface (that is, a surface inside the porous particle where a void 14 is present) of the porous particle 10. In the drawing shown, the coating 16 is particulate, and is scattered on the surface of the porous particle 10.

By using this type of lithium composite oxide having a layered structure, which is provided with a coating containing tungsten oxide and lithium tungstate and has a characteristic porous structure, in the positive electrode active substance, it is possible to lower the resistance of the lithium ion secondary battery 100 and suppress an increase in resistance when the lithium ion secondary battery 100 is repeatedly charged and discharged.

It is thought that this is for the following reason.

By using a porous particle which has the specified void ratio and in which a plurality of voids having the specified size are present, as in the present embodiment, the surface area increases and thereby resistance can be lowered. Furthermore, the lithium tungstate contained in the coating can supply lithium ions, and can therefore further lower the resistance.

On the other hand, the positive electrode active substance is in the form of secondary particles composed of aggregated primary particles. Therefore, in cases where charging and discharging is repeatedly carried out, the positive electrode active substance undergoes repeated expansion and contraction, which causes cracks in secondary particles and causes an increase in resistance. In particular, cracks readily occur if the number of voids is high in the positive electrode active substance.

However, in the present embodiment, by using a porous particle which has the specified void ratio and in which a plurality of voids having the specified size are present, the strength of secondary particles increases and cracking in the secondary particles can be prevented. In addition, the coating contains tungsten oxide. The tungsten oxide does not allow passage of lithium ions, and is therefore stable even in cases where charging and discharging are carried out at a high rate. Therefore, the presence of the tungsten oxide contained in the coating improves the strength and durability of secondary particles and can suppress cracking of secondary particles over a long period of time.

The content of the positive electrode active substance in the positive electrode active substance layer 54 (that is, relative to the total mass of the positive electrode active substance layer 54) is not particularly limited, but is desirably 70 mass % or more, and more desirably 80 mass % or more.

The positive electrode active substance layer 54 may further contain positive electrode active substances other than the lithium composite oxide having a layered structure as long as the advantageous effects of the present disclosure are not impaired.

The positive electrode active substance layer 54 can further contain components other than the positive electrode active substance, for example trilithium phosphate, electrically conductive materials, binders, and the like. Carbon black such as acetylene black (AB) and other carbon materials (for example, graphite or the like) can be advantageously used as an electrically conductive material. For example, poly(vinylidene fluoride) (PVDF) or the like can be used as a binder.

The content of trilithium phosphate in the positive electrode active substance layer 54 is not particularly limited, but is desirably not less than 1 mass % but not more than 15 mass %, and more desirably not less than 2 mass % but not more than 12 mass %.

The content of an electrically conductive material in the positive electrode active substance layer 54 is not particularly limited, but is desirably not less than 1 mass % but not more than 15 mass %, and more desirably not less than 3 mass % but not more than 13 mass %.

The content of a binder in the positive electrode active substance layer 54 is not particularly limited, but is desirably not less than 1 mass % but not more than 15 mass %, and more desirably not less than 1.5 mass % but not more than 10 mass %.

For example, a copper foil or the like can be mentioned as the negative electrode current collector 62 that constitutes the negative electrode sheet 60.

The negative electrode active substance layer 64 contains a negative electrode active substance. For example, a carbon material such as graphite, hard carbon or soft carbon can be used as the negative electrode active substance. The graphite can be natural graphite or artificial graphite, and may be amorphous carbon-coated graphite in a form in which graphite is coated with an amorphous carbon material. The negative electrode active substance layer 64 can contain components other than the active substance, such as a binder or a thickening agent. For example, a styrene-butadiene rubber (SBR), poly(vinylidene fluoride) (PVDF), or the like, can be used as a binder. For example, carboxymethyl cellulose (CMC) or the like can be used as a thickening agent.

The content of the negative electrode active substance in the negative electrode active substance layer is desirably 90 mass % or more, and more desirably not less than 95 mass % but not more than 99 mass %. The content of a binder in the negative electrode active substance layer is desirably not less than 0.1 mass % but not more than 8 mass %, and more desirably not less than 0.5 mass % but not more than 3 mass %. The content of a thickening agent in the negative electrode active substance layer is desirably not less than 0.3 mass % but not more than 3 mass %, and more desirably not less than 0.5 mass % but not more than 2 mass %.

Examples of the separator 70 include porous sheets (films) including resins such as polyethylene (PE), polypropylene (PP), polyesters, cellulose and polyamides. This type of porous sheet may have a single layer structure or a laminated structure having two or more layers (for example, a three layer structure obtained by laminating a PP layer on both surfaces of a PE layer). A heat-resistant layer (HRL) may be provided on a surface of the separator 70.

The non-aqueous electrolyte typically contains a non-aqueous solvent and a supporting electrolyte.

Organic solvents used in electrolyte solutions of ordinary lithium ion secondary batteries, such as a variety of carbonates, ethers, esters, nitriles, sulfones and lactones, can be used without particular limitation as the non-aqueous solvent. Specific examples thereof include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC) and trifluorodimethyl carbonate (TFDMC). It is possible to use one such non-aqueous solvent in isolation or an appropriate combination of two or more types thereof.

Lithium salts such as $LiPF_6$, $LiBF_4$ and lithium bis(fluorosulfonyl)imide (LiFSI) (and desirably $LiPF_6$) can be advantageously used as the supporting electrolyte. The concentration of the supporting electrolyte is desirably not less than 0.7 mol/L but not more than 1.3 mol/L.

It should be noted that the non-aqueous electrolyte may contain components other than those described above, for example a variety of additives such as gas generating agents such as biphenyl (BP) and cyclohexylbenzene (CHB); and thickening agents, as long as the advantageous effect of the present disclosure is not significantly impaired.

The lithium ion secondary battery 100, which is configured in the manner described above, has a low initial resistance. In addition, the lithium ion secondary battery 100 exhibits excellent durability because an increase in resistance following repeated charging and discharging is suppressed.

The lithium ion secondary battery 100 can be used in a variety of applications. Advantageous applications include motive power sources mounted on vehicles such as electric vehicles (EV), hybrid vehicles (HV) and plug-in hybrid vehicles (PHV). The lithium ion secondary battery 100 can typically also be used in the form of a battery pack in which a plurality of batteries are connected in series and/or in parallel.

As one example, an explanation will be given of a square lithium ion secondary battery 100 provided with a flat wound electrode body 20. However, the non-aqueous electrolyte secondary battery disclosed here can also be constituted as a lithium ion secondary battery having a stacked-type electrode body. In addition, the non-aqueous electrolyte secondary battery disclosed here can be configured as a cylindrical lithium ion secondary battery, a laminate-type lithium ion secondary battery, or the like. In addition, the non-aqueous electrolyte secondary battery disclosed here can be configured as a non-aqueous electrolyte secondary battery other than a lithium ion secondary battery.

Explanations will now be given of examples relating to the present disclosure, but it is not intended that the present disclosure is limited to these examples.

Examples 1 to 3 and Comparative Examples 1 and 2

Production of Positive Electrode Active Substance

A starting material aqueous solution containing nickel sulfate, cobalt sulfate and manganese sulfate at a molar ratio of 1:1:1 was prepared. Meanwhile, a reaction liquid whose pH was adjusted by sulfuric acid and aqueous ammonia was prepared in a reactor. In addition, a pH adjustment liquid was prepared by mixing an aqueous solution of sodium carbonate and an aqueous solution of ammonium carbonate.

The starting material aqueous solution was added under stirring to the reaction liquid at a specified speed while controlling the pH using the pH adjustment liquid. Crystallization was terminated after a specified period of time had passed. Precursor particles, which were porous hydroxide particles, were obtained by washing the crystallized product with water, filtering and drying.

Here, by altering the addition speed of the starting material aqueous solution, the pH, the stirring speed and the reaction time, the porous structure of the precursor particles was altered and positive electrode active substances having different porous structures were obtained. In Comparative Example 1 in particular, primary particles were aggregated more densely and the void ratio was reduced by lengthening the reaction time (the crystallization time). In Comparative Example 2, one large void was produced by lowering the concentration of ammonia.

The obtained precursor particles and lithium carbonate were mixed so that the molar ratio (Li/Me) of lithium (Li) relative to the total amount (Me) of nickel, cobalt and manganese was 1.1. A lithium composite oxide ($LiNi_{1/3}Co_{1/3}Mn_{1/3}O_2$) having a layered structure, which is a porous particle, was obtained by firing this mixture for 10 hours at 950° C. in an electric furnace.

The obtained lithium composite oxide was washed with water, dried, and then mixed with tungsten oxide ($WO_3$) and lithium tungstate ($Li_2WO_4$). Water was added to this mixture at a quantity of 10 mass % relative to the lithium composite oxide, and further mixing was then carried out. A lithium composite oxide having a coating of tungsten oxide ($WO_3$) and lithium tungstate (LWO) was obtained as a positive electrode active substance by drying the mixture for 12 hours at 150° C.

Production of Evaluation Lithium Ion Secondary Batteries

A positive electrode active substance layer-forming paste was prepared by mixing the thus produced positive electrode active substance, acetylene black (AB) as an electrically conductive material and poly(vinylidene fluoride) (PVDF) as a binder at mass ratio of a positive electrode active substance:AB:PVDF=90:8:2 in N-methylpyrrolidone (NMP). A positive electrode sheet was produced by coating this paste on both surfaces of an aluminum foil having a thickness of 15 µm, drying and pressing.

In addition, a negative electrode active substance layer-forming paste was prepared by mixing natural graphite (C) as a negative electrode active substance, a styrene-butadiene rubber (SBR) as a binder and carboxymethyl cellulose (CMC) as a thickening agent in ion exchanged water at a mass ratio of C:SBR:CMC=98:1:1. A negative electrode sheet was produced by coating this paste on both surfaces of a copper foil with a thickness of 10 µm, drying and pressing.

In addition, two porous polyolefin sheets having a PP/PE/PP three-layer structure and having a thickness of 24 µm were prepared as separator sheets.

The prepared positive electrode sheet and negative electrode sheet and the two prepared separator sheets were overlaid and wound, thereby preparing a wound electrode body. Electrode terminals were attached to the positive electrode sheet and negative electrode sheet of the produced wound electrode body by welding, and the welded body was housed in a battery case having an injection port.

Next, a non-aqueous electrolyte solution was injected into the battery case from the injection port, and the injection port was then tightly sealed. It should be noted that, a non-aqueous electrolyte solution obtained by dissolving LiPF$_6$ as a supporting electrolyte at a concentration of 1.0 mol/L in a mixed solvent containing ethylene carbonate (EC), dimethyl carbonate (DMC) and ethyl methyl carbonate (EMC) at a volume ratio of 3:4:3 was used as the non-aqueous electrolyte solution.

Evaluation lithium ion secondary batteries were obtained in this way.

Comparative Example 3

A lithium composite oxide was produced under the same conditions as those used in Example 3. An evaluation lithium ion secondary battery was produced by a method similar to that described above, using this lithium composite oxide as a positive electrode active substance.

Comparative Example 4

A lithium composite oxide was produced under the same conditions as those used in Example 3.

This lithium composite oxide was washed with water, dried, and then mixed with lithium tungstate (Li$_2$WO$_4$). Water was added to this mixture at a quantity of 10 mass % relative to the lithium composite oxide, and further mixing was then carried out. A lithium composite oxide having a coating of lithium tungstate (LWO) was obtained by drying the mixture for 12 hours at 150° C.

An evaluation lithium ion secondary battery way produced by a method similar to that described above, using this lithium composite oxide as a positive electrode active substance.

Comparative Example 5

A lithium composite oxide was produced under the same conditions as those used in Example 3.

This lithium composite oxide was washed with water, dried, and then mixed with tungsten oxide (WO$_3$). Water was added to this mixture at a quantity of 10 mass % relative to the lithium composite oxide, and further mixing was then carried out. A lithium composite oxide having a tungsten oxide coating was obtained as a positive electrode active substance by drying the mixture for 12 hours at 150° C.

An evaluation lithium ion secondary battery way produced by a method similar to that described above, using this lithium composite oxide as a positive electrode active substance.

Examples 4 to 7

A lithium composite oxide was produced under the same conditions as those used in Example 3.

Lithium composite oxides having a coating of tungsten oxide and lithium tungstate were obtained as positive electrode active substances by washing the obtained lithium composite oxide with water, drying, and then mixing with tungsten oxide and lithium tungstate by a method similar to that described above. Here, the mixing time was altered.

Evaluation lithium ion secondary batteries were produced by a method similar to that described used in Example 1, using these positive electrode active substances.

Examples 8 to 11

A lithium composite oxide was produced under the same conditions as those used in Example 3.

Lithium composite oxides having a coating of tungsten oxide and lithium tungstate were obtained as positive electrode active substances by washing the obtained lithium composite oxide with water, drying, and then mixing with tungsten oxide and lithium tungstate by a method similar to that described above. Here, the mixing amounts of tungsten oxide and lithium tungstate were altered.

Evaluation lithium ion secondary batteries were produced by a method similar to that described used in Example 1 using these positive electrode active substances.

Void Ratio of Positive Electrode Active Substance

A SEM image of a cross section of a thus produced positive electrode active substance was obtained. The outlines of 100 arbitrarily selected secondary particles were determined, and the ratio of the total area of void parts relative to the area of the overall particle (the sum of the area occupied by the particle and the area of void parts) was calculated as a percentage. The average value for these 100 particles was taken to be the void ratio (%). The results are shown in the tables.

Void Diameter Relative to Particle Diameter

A SEM image of a cross section of the thus produced positive electrode active substance was obtained. In this cross section SEM image, the maximum diameter of the particle was first determined, and this is taken to be the length L. Next, the maximum diameter among diameters that were perpendicular to the length L was determined, and this was taken to be the width W. This processing was carried out using "WinROOF 6.1.1" image analysis software (available from Mitani Corporation). The average value of the length L and the width W (that is, (length L+width W)/2) was determined as the particle diameter.

Next, voids were subjected to inscribed elliptic approximation. This inscribed elliptic approximation was carried out using "WinROOF 6.1.1" image analysis software (available from Mitani Corporation). In cases where five or more ellipses were listed as inscribed ellipses, five inscribed ellipses were selected in order from the ellipse having the largest area, and in cases where four or fewer ellipses were listed as inscribed ellipses, all of the inscribed ellipses were selected.

For each inscribed ellipse, the average value of the length LH and width WH of the inscribed ellipse (that is, (length LH+width WH)/2) was determined, and this average value was taken to be the inscribed ellipse diameter. For the selected inscribed ellipses, the average value of this inscribed ellipse diameter was determined, and this was taken to be the void diameter.

The number of voids in which the diameter of the void had a length that was at least 10% of the particle diameter was counted. The results are shown in the tables.

Abundance Ratio of Tungsten on Overall Surface Relative to Outer Surface

A SEM image of a cross section was subjected to EDX mapping. Parts where tungsten element was present were colored, and the total area of colored parts (that is, parts where tungsten was present) on the overall surface of one particle and the total area of colored parts on the outer surface of this particle were determined. The ratio of the total area of colored parts on the overall surface relative to the total area of colored parts on the outer surface (total area of colored parts on the overall surface/total area of colored parts on outer surface) was calculated. This ratio was determined for 20 particles, and the average value thereof was calculated. This average value was taken to be the abundance ratio of tungsten on the overall surface relative to the outer surface (that is, the ratio of the amount of tungsten contained in the coating present on the overall surface of the lithium composite oxide relative to the amount of tungsten contained in the coating present on the outer surface of the lithium composite oxide). The results are shown in the tables.

Measurement of Coverage Ratio of Positive Electrode Active Substance

A measurement sample was produced by placing a positive electrode active substance in an aluminum sample pan in a glove box, and pressing the positive electrode active substance with a tablet molding machine. This measurement sample was attached to an XPS analysis holder and subjected to XPS measurements under the conditions shown below using an XPS analysis apparatus (PHI 5000 VersaProbe II, available from ULVAC-PHI, Inc.). Elements to be measured were subjected to compositional analysis, and the proportion of each element was calculated in terms of "Atomic %". Using this value, the coverage ratio (%) was calculated using the formula: {W/(W+Ni+Co+Mn)}×100. The results are shown in the tables.

X-ray source: AlKα monochromatic light
Irradiation range: φ100 μm HP (1400×200)
Current and voltage: 100 W, 20 kV
Neutralizing gun: ON
Path energy: 187.85 eV (wide), 46.95 to 117.40 eV (narrow)
Step: 0.4 eV (wide), 0.1 eV (narrow)
Shift correction: C—C, C—H (C1s, 284.8 eV)
Peak data: Handbook of XPS (ULVAC-PHI)

Activation Treatment

Each produced evaluation lithium ion secondary battery was placed in an environment at a temperature of 25° C. Activation (initial charging) was carried out using a constant current-constant voltage method, which included subjecting each evaluation lithium ion secondary battery to constant current charging at a current of ⅓ C to a voltage of 4.2 V, and then constant voltage charging until the current reached 1/50 C, thereby achieving a fully charged state. Next, each evaluation lithium ion secondary battery was subjected to constant current discharging at a current of ⅓ C to a voltage of 3.0 V.

Measurement of Initial Resistance

Each activated evaluation lithium ion secondary battery was adjusted to an open circuit voltage of 3.70 V. Each battery was then placed in an environment at a temperature of −28° C. Each battery was discharged for 8 seconds at a current of 20 C, and the voltage drop amount ΔV was determined. Next, the battery resistance was calculated by dividing the voltage drop amount ΔV by the discharge current (20 C), and this battery resistance was taken to be the initial resistance. The initial resistance of Comparative Example 1 was taken to be 1, and the initial resistance values for the other comparative examples and examples were determined as a ratio relative to this. The results are shown in the table.

Evaluation of Increase in Battery Resistance Following Long Term Use

Each activated evaluation lithium ion secondary battery, whose initial resistance had been measured, was left in an environment at 60° C., and a cycle including constant current charging at a current of 10 C to a voltage of 4.2 V and then constant current discharging at a current of 10 C to a voltage of 3.3 V was repeated 500 times. The battery resistance after the 500th cycle was measured using the same method as that described above. As an indicator of resistance increase, the resistance increase rate was determined from the formula: (battery resistance after 500th charging and discharging cycle−initial resistance)/initial resistance. The results are shown in the tables.

TABLE 1

| | Coating | | Particle | | Abundance ratio of W on overall surface relative to outer surface | Initial resistance ratio | Resistance increase rate (%) |
|---|---|---|---|---|---|---|---|
| | LWO | WO₃ | Void ratio (%) | Number of voids having diameters ≥10% of particle diameter | | | |
| Example 1 | present | present | 20 | ≥2 | 1.2 | 88 | 1.7 |
| Example 2 | present | present | 50 | ≥2 | 1.2 | 90 | 1.8 |
| Example 3 | present | present | 35 | ≥2 | 1.2 | 87 | 1.8 |
| Comparative Example 1 | present | present | 10 | 0 | 1 | 100 | 2.2 |
| Comparative Example 2 | present | present | 35 | 1 | 1.1 | 98 | 2.7 |
| Comparative Example 3 | absent | absent | 35 | ≥2 | — | 107 | 3 |
| Comparative Example 4 | present | absent | 35 | ≥2 | 1.2 | 93 | 2.5 |
| Comparative Example 5 | absent | present | 35 | ≥2 | 1.2 | 98 | 1.8 |
| Example 4 | present | present | 35 | ≥2 | 1.3 | 82 | 1.7 |
| Example 5 | present | present | 35 | ≥2 | 1.6 | 81 | 1.6 |
| Example 6 | present | present | 35 | ≥2 | 1.8 | 83 | 1.5 |
| Example 7 | present | present | 35 | ≥2 | 1.9 | 88 | 1.5 |

TABLE 2

| | Coating | | Particle | | | Coverage ratio (%) of positive electrode active substance | Initial resistance ratio | Resistance increase rate (%) |
| | LWO | WO$_3$ | Void ratio (%) | Number of voids having diameters ≥10% of particle diameter | Abundance ratio of W on overall surface relative to outer surface | | | |
|---|---|---|---|---|---|---|---|---|
| Example 5 | present | present | 35 | ≥2 | 1.6 | 8 | 81 | 1.6 |
| Example 8 | present | present | 35 | ≥2 | 1.6 | 10 | 76 | 1.5 |
| Example 9 | present | present | 35 | ≥2 | 1.6 | 15 | 74 | 1.5 |
| Example 10 | present | present | 35 | ≥2 | 1.6 | 20 | 74 | 1.4 |
| Example 11 | present | present | 35 | ≥2 | 1.6 | 23 | 80 | 1.3 |

From the results in Table 1 and Table 2, it can be understood that the initial resistance and the resistance increase rate are remarkably low in cases where a lithium composite oxide having a layered structure is a porous particle, the void ratio of the porous particle is not less than 20% but not more than 50%, the porous particle has two or more voids having diameters that are at least 10% of the particle diameter, and the surface of the porous particle is provided with a coating containing tungsten oxide and lithium tungstate.

Therefore, it can be understood that the non-aqueous electrolyte secondary battery disclosed here can provide a non-aqueous electrolyte secondary battery which has a low initial resistance and in which an increase in resistance following repeated charging and discharging is suppressed.

In addition, from the results for Examples 3 to 7 in Table 1, it can be understood that the initial resistance is particularly low in cases where the abundance ratio of tungsten on the overall surface relative to tungsten on the outer surface is not less than 1.3 but not more than 1.8. Therefore, it can understood that the advantageous effect of lowering initial resistance is particularly high in cases where the ratio of the amount of tungsten contained in the coating present on the entire surface of the lithium composite oxide relative to the amount of tungsten contained in the coating present on the outer surface of the lithium composite oxide is not less than 1.3 but not more than 1.8.

In addition, from the results in Table 2, it can be understood that the initial resistance is particularly low when the coverage ratio of the surface of the porous particle by the coating falls within the range not less than 10% but not more than 20%. Therefore, it can be understood that the advantageous effect of lowering the initial resistance is particularly high in cases where the coverage ratio of the surface of the porous particle by the coating falls within the range not less than 10% but not more than 20%.

Specific examples of the present disclosure have been explained in detail above, but these are merely examples, and do not limit the scope of the claims. The features set forth in the claims also encompass modes obtained by variously modifying or altering the specific examples shown above.

What is claimed is:

1. A non-aqueous electrolyte secondary battery comprising a positive electrode, a negative electrode and a non-aqueous electrolyte, wherein
   the positive electrode is provided with a positive electrode active substance layer,
   the positive electrode active substance layer contains a lithium composite oxide having a layered structure,
   the lithium composite oxide includes a porous particle,
   a void ratio of the porous particle is not less than 20% but not more than 50%,
   the porous particle contains two or more voids having diameters that are at least 10% of the particle diameter of the porous particle, and
   a surface of the porous particle is provided with a coating formed by mixing the porous particle with a coating material that contains tungsten oxide and lithium tungstate, wherein the surface of the porous particle comprises an outer surface of the porous particle and a surface of voids within the porous particle.

2. The non-aqueous electrolyte secondary battery according to claim 1, wherein a ratio of an amount of tungsten contained in the coating present on the surface of the porous particle relative to an amount of tungsten contained in the coating present only on the outer surface of the porous particle is not less than 1.3 and not more than 1.8.

3. The non-aqueous electrolyte secondary battery according to claim 1, wherein a coverage ratio of the coating on the surface of the porous particle is not less than 10% and not more than 20%.

4. The non-aqueous electrolyte secondary battery according to claim 1, wherein the coating material consists of tungsten oxide and lithium tungstate.

5. The non-aqueous electrolyte secondary battery according to claim 1, wherein the coating is comprised of particulates scattered on the surface of the porous particle.

* * * * *